C. W. MERRILL.
PRESSURE FILTER.
APPLICATION FILED MAR. 7, 1906.

905,341.

Patented Dec. 1, 1908.
10 SHEETS—SHEET 9.

WITNESSES:
C. E. Ashley
Charles Engel

INVENTOR
Charles W. Merrill
By his Attorney,

UNITED STATES PATENT OFFICE.

CHARLES W. MERRILL, OF LEAD, SOUTH DAKOTA.

PRESSURE-FILTER.

No. 905,341.      Specification of Letters Patent.      Patented Dec. 1, 1908.

Application filed March 7, 1906. Serial No. 304,722.

*To all whom it may concern:*

Be it known that I, CHARLES W. MERRILL, a citizen of the United States, and resident of Lead, county of Lawrence, State of South Dakota, have invented a new and useful Improvement in Pressure-Filters, of which the following is a specification.

My invention relates to improvements in apparatus for separating unfilterable material from a mixture of filterable and unfilterable matter, and it particularly relates to improvements in pressure filters in which the separation and treatment of such material is effected.

The primary object of my invention is to facilitate and cheapen the removal from the containers or filter presses, of the material which will not pass through the filtering medium.

A further object is to permit of the independent introduction of cleansing, precipitating, or other material to the containers.

A still further object is to effect a rapid removal of the unfilterable material which accumulates in the containers of the press without separating the units of the press.

In the operation of filter presses or similar filters, it is customary to separate the units of which each press is composed and remove the solid, semi-solid or unfilterable material from the distance frame or container separately, usually by hand. This method is naturally expensive involving so much hand labor for each of the many cakes to be removed, and furthermore the wear and tear on the filtering medium covering the filter plates, is heavy and the time so occupied during which the press cannot be used for filtering, greatly reduces its capacity per unit of time. Hence the scope of the ordinary filter press is limited to the separation of solids from liquids to cases where the value of such materials is such as to permit of the expenses outlined above. Furthermore, the necessity of removing the filtered material from each distance frame or container separately, results in the use of deep distance frames in order to increase their separate capacity. The resultant thick cake of solid or semi-solid material increases the pressure necessary to accomplish the filtering and thus adds another factor to the cost of operating said filter presses. Furthermore, the use of high pressures has limited the size of filter presses heretofore to about six tons capacity, whereas my press can be constructed up to 50 and even 100 tons capacity in favorable cases with economical cost factors. This increase in size necessitates other improvements.

The present invention will be best understood by reference to the accompanying ten sheets of drawings, in which.

Similar letters refer to similar parts throughout the several views.

Figure 1:
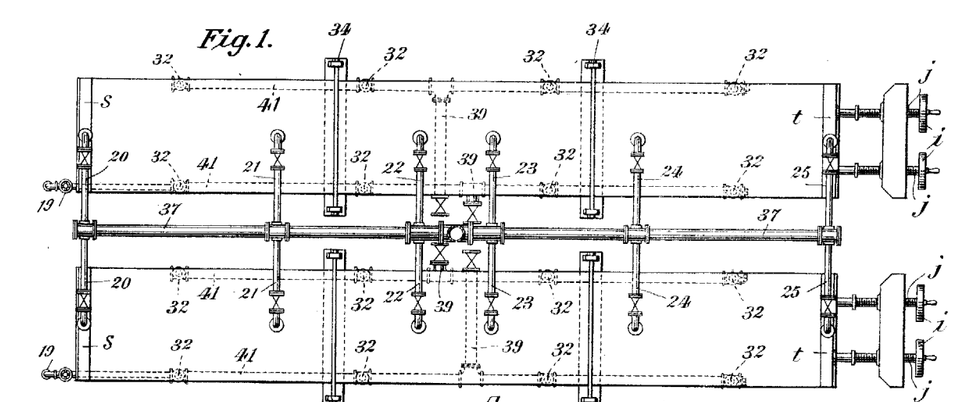
Figure 1 is a plan view of a filter plant showing two presses put together side by side.
Figure 2:
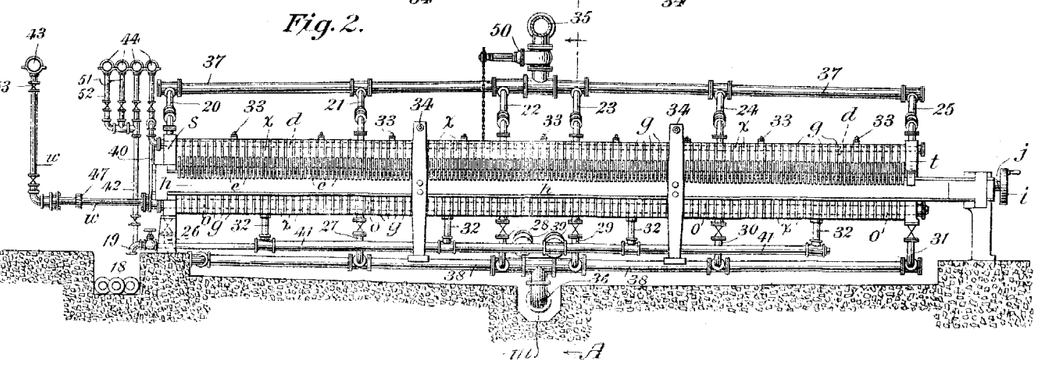
Fig. 2 is a longitudinal elevation of a plant showing the arrangement of the feed and discharge pipes.

*General characteristics.*—In Figs. 1 and 2 a filter press is shown of what is called the "closed delivery" type as distinguished from the "open delivery" type. In the former type, the filtrate is discharged into a suitable channel within the filter press, whereas in the open delivery system the filtrate from each filter plate is discharged through a special opening into a trough or other receptacle for collecting the same on the exterior of the press, but I do not limit myself to any type of delivery of the filterable component.

In Figs. 1 and 2 of the drawings, $s$ represents, what is for convenience termed, the stationary end of the press; $h$ the frame of the press; $j$ is a screw which forces the movable end or follower head $t$ forward in the frame by means of the wheels $i$ or any other convenient mechanism. $x$ $x$ are the exterior frames of a series of containers, and $g$ $g$ are the filter plates. All of these devices and parts are common to the ordinary form of filter press. These elements, when set up, compose two filter presses placed side by side as shown in Figs. 1, 2, 3 and 4. For convenience, the different parts of the apparatus will be described separately.

Figure 20:
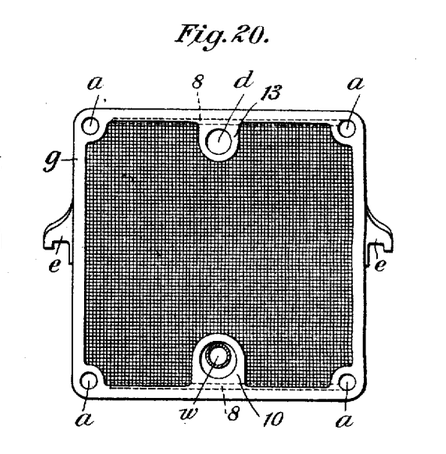
Figs. 20 and 21 are end views of one of the filter plates showing grooves through which the discharge of the filtrate is effected somewhat differently arranged in each figure.
Figures 21, 22:
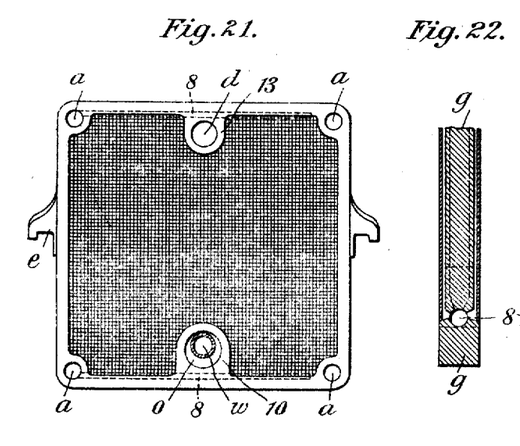
Fig. 22 is a vertical cross section on the line O—O of Fig. 23 of one end of the filter plates showing the grooves through which the discharge is effected.
Figure 23:
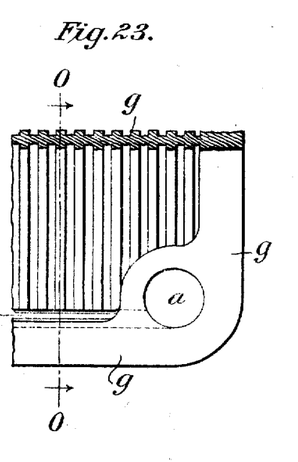
Fig. 23 is an enlarged front view of one end of the filter plates shown in Fig. 20.

*The filter plates.*—The filter plates are preferably of the construction shown in Figs. 20, 21, 22 and 23, which show the form of filter plate adapted to be used in connection with the various forms of container hereinafter described. Each filter plate is provided with one or more openings $a$ through which the liquids, vapors or gases pass, and which, with the corresponding opening in the containers hereinafter described when placed together in the filter press, make a continuous passage. $d$ is a corresponding inlet through which the material to be filtered is introduced, which inlet is of the same general character as that in the containers and becomes continuous when the various parts are put together in the filter press. The filtrate from the plates passes into the grooves 8, and thus may be discharged either from each plate separately by what has heretofore been referred to as the open delivery system, or it may be discharged into an opening $a$ $a'$ as shown in the various views. When four openings $a$ $a'$ are provided in the container as shown in the construction shown in Figs. 10 and 19, the filter plates have of necessity to be of the form shown in those figures and to be provided with similar openings $a$ $a'$. In this case every other plate is reversed so that the grooves 8 connect alternately with each side of the press, as is shown in Figs. 20 and 21.

*The containers.*—Various constructions of containers may be used without departing from the spirit of my invention. $x$ is in each case the frame of the container which may be square in cross section or of any other convenient shape.

Figure 8:
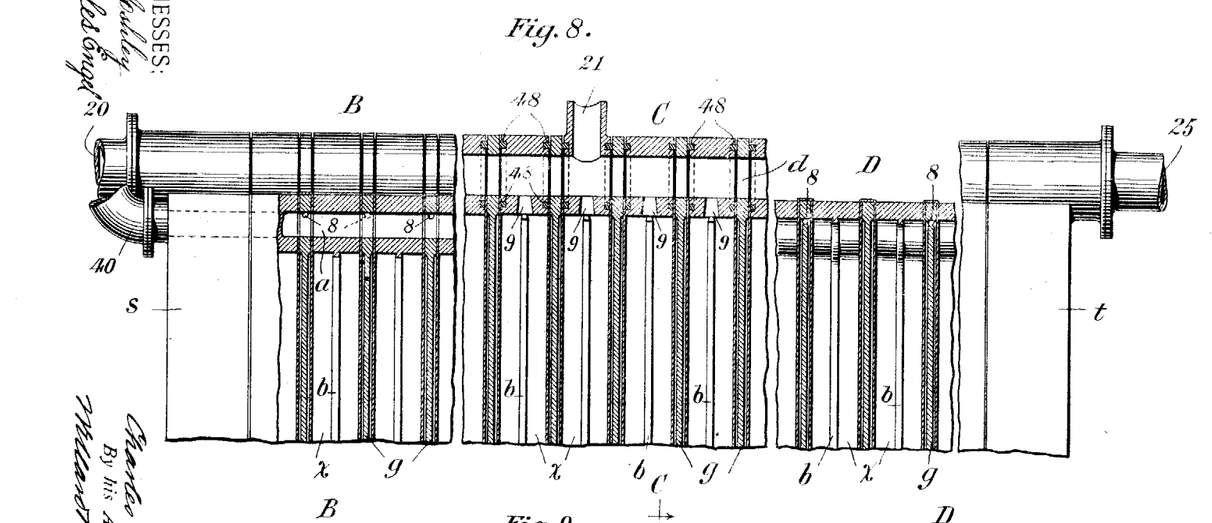
Fig. 8 is a vertical section on three different planes of the containers when put together in the press on the lines B—B, C—C, D—D, of Fig. 9.
Figure 9:
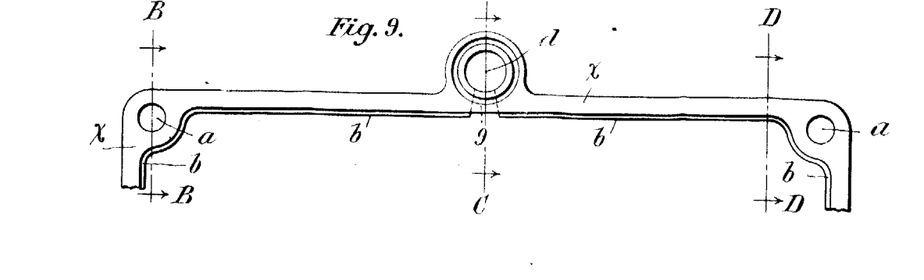
Fig. 9 is an elevation of the upper part of the form of containers shown in Fig. 8.
Figure 10:
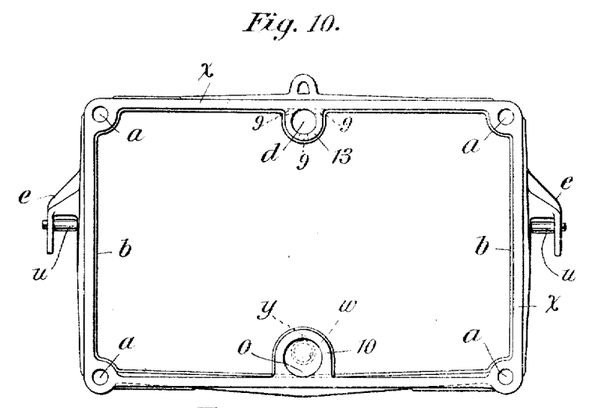
Fig. 10 is an elevation of a type of container which may be employed, if convenient, in connection with a closed delivery press.
Figure 11:
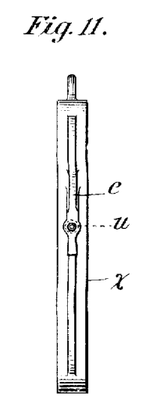
Fig. 11 is an end view of the form of container shown in Fig. 10.
Figure 19:
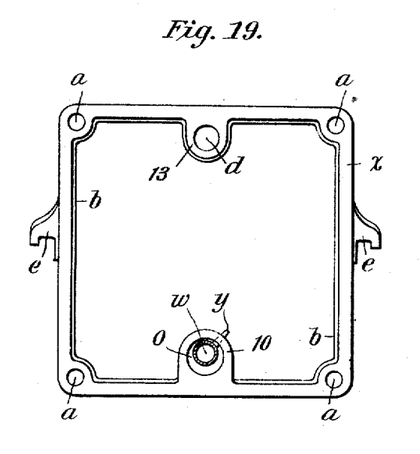
Fig. 19 is a vertical end view of the simplest form of container shown merely for the purpose of making the series complete.

The type of container shown in Figs. 10, 11 and 19, is assumed to be used in the various views showing the pipe connections other than Figs. 8 and 9. In it $o$ is an opening or outlet in the ring 10, formed in the bottom of the container through which the semi-solid or the unfilterable material, hereinafter for convenience called the unfilterable component, is removed from the containers, and which, when a series of containers is put together in a filter press makes a continuous passage through the press which is closed at the ends in any convenient manner and can be arranged to discharge into any suitable receptacle. I prefer to use a downward discharge or other suction producing device, because by such means the level of the pulp in the discharge channel is kept low, and the cutting action of the stream from the nozzle is thus rendered more efficient. $a$ is a corresponding inlet for treating the unfilterable component in place with liquids, vapors or gases, and which is preferably placed at either or both upper corners of the container, or at all four corners as shown, and in like manner forms a continuous passage or passages when the containers are placed together in the filter press. $d$ is an inlet in a ring 13 formed on the upper wall of the container through which the material to be filtered is introduced, which inlet is of the same general character and becomes a continuous passage when the containers are put together within the filter press, and is provided with the openings 9 from which the material is introduced from the passage $d$ into the chamber.

The details of construction shown in Figs. 10 and 11 are applicable to all containers of the different types hereinbefore described. In these views the container is shown provided with hangers $e$ which carry rollers $u$, for the purpose of facilitating the movement of the containers upon the frame $h$ of the press. For the purposes of aiding the operation of washing out the unfilterable component the bottom of the container is made sloping from each side towards the center, and the sides are shown truss shaped, thus combining strength with lightness of construction, which is a matter of great importance in large presses. This particular type is also provided with a wedge shaped rib $b$ described and claimed by me in United States Letters Patent No. 813,014 heretofore issued to me, for the purpose of facilitating the treatment of the unfilterable component.

Figure 16:
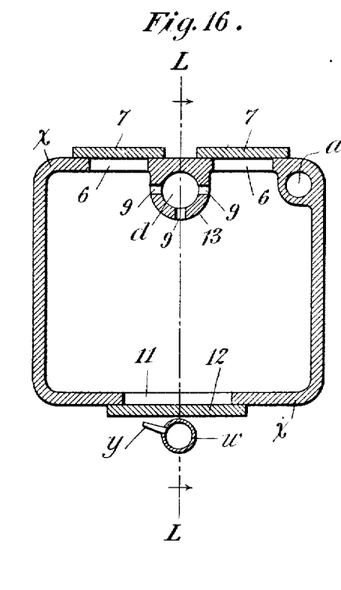
Fig. 16 is a vertical longitudinal section of a form of container for use in an open delivery press on the line K—K of Fig. 17.
Figure 17:
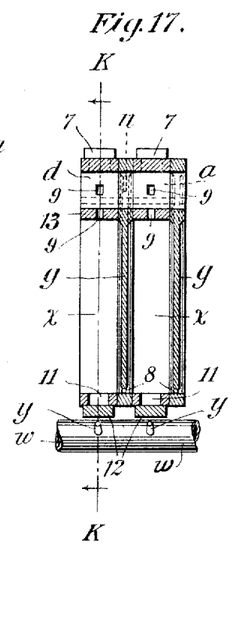
Fig. 17 is a vertical cross section on the line L—L of Fig. 16 of a series put together.
Figure 18:
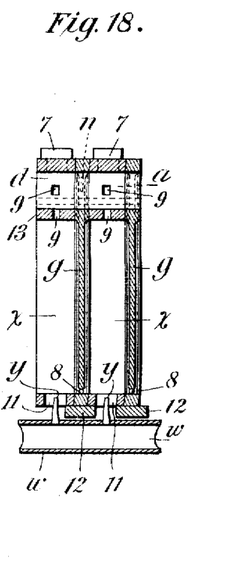
Fig. 18 is a vertical cross section of a series of containers showing the rotative supply pipe in a different position.

In the construction of container shown in Figs. 16, 17 and 18, $d$ is the inlet, through which the material to be filtered is introduced, which inlet is of the same general character as before and forms a continuous passage when the containers are put together in the filter press. It is provided with the inlets 9 as before leading into the interior, $a$ is the inlet for treating the unfilterable component in place.

In the construction shown in Figs. 16, 17 and 18, the washout as well as the discharge is effected through a rectangular opening 11 in the bottom of the container, which opening is closed preferably by means of a sliding gate 12. Fig. 21 shows the gates closed, and Fig. 22 shows them open.

*The washout devices.*—The washing out of the solid contents of the containers is effected without reference to the form of container used by means of any device which is capable of introducing a suitable volume of cleansing medium, either liquid, gas or vapor, at any desired angle or angles, or any desired point or points, into each container.

I prefer in practice to employ a rotative pipe provided with suitable nozzles, slits or openings of any convenient length or size through which liquid, vapor or gas, is introduced into each of the containers under pressure at any desired angle for the purpose of washing out or removing the unfilterable component. The simplest construction of this device is shown in Figs. 10, 11 and 19, in which a pipe $w$ and single nozzle $y$ entering into each chamber is shown placed within the container.

In the constructon for use with open delivery shown in Figs. 16, 17 and 18, the rotative pipe is provided with a similar series of nozzles $y$ $y$ which enter through openings 11 into each container, which opening 11 is closed in each case by means of a sliding gate 12: Fig. 17 shows the gate closed, and Fig. 18 shows it open, and the pipe $w$ rotated so that the nozzles $y$ $y$ enter into the openings in such a manner as to permit of a discharge into the interior of the containers.

Figures 5, 6:
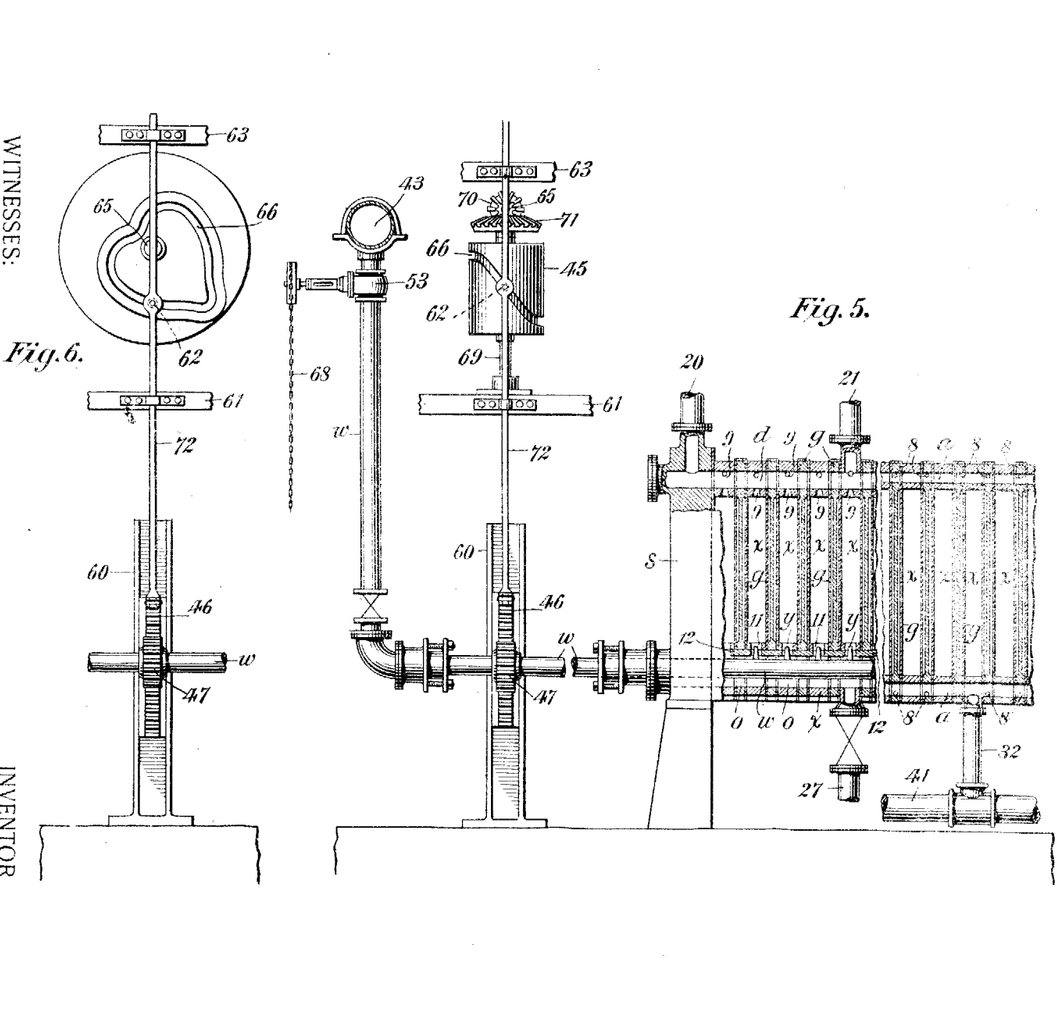
Fig. 5 is an elevation partly in vertical section on two different planes of one end of a plant showing the arrangement of the containers omitting the solution pipes and their connections.
Fig. 6 is a vertical elevation of a different form of mechanism for actuating the washout mechanism.

The rotation of the pipe $w$ may be effected by hand or by any convenient mechanical device. In practice it may be found convenient to effect it by means of the devices shown in Figs. 5 and 6. These show the pipe $w$ carrying on its outer end, a pinion 47, which engages with a sliding rack 46 arranged to move upwards and downwards in a suitable frame 60 as shown in Figs. 5 and 6. The movement of the rack 46 is controlled by means of a rod 72 actuated by a cam device which may be either of the nature shown in Fig. 5 or that shown in Fig. 6. In the first view a cylinder 45 is shown rotating on a shaft 69 supported on brackets 61 and 63 which movement is imparted from any convenient source of power by a shaft 65 carrying a pinion 70 engaging with a pinion 71 on the shaft 72. The face of the cylinder 45 is provided with a cam groove 66 and a roller 62 on the rod 72 engages therewith, and the effect of the rotary motion of the cylinder is to cause the rod to move upward or downward with a varying degree of speed according to the curvature of the groove. The heart-shaped cam shown in Fig. 6 is an equivalent device. In this construction the cam is attached to the horizontal shaft 65 and rotates in a vertical plane. The vertical rod 72 contains a roller 62 as before, which is free to move in a corresponding groove 66 on the cam or disk. As the cam rotates at a uniform velocity the roller remains fixed as to horizontal motion but moves vertically as the radius from the center of the cam to the position of the roller increases or decreases. The vertical motion is equal to the change in length of this radius. The velocity of vertical motion is dependent upon the change in the length of this radius according to the degree of the angle or the center of rotation. Both of the grooves 66 whether on the cylinder shown in Fig. 5, or in the heart-shaped cam shown in Fig. 6, are preferably so designed as to produce a nozzle speed approximately inverse by proportion to the distance from the nozzle to the interior boundary of the container.

Figure 12:
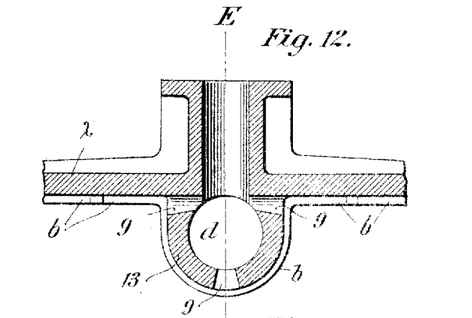
Figs. 12, 13 and 14 are a sectional elevation, plan view and vertical section of a detail of the feed, Fig. 12 being taken on the line F—F, Fig. 13 and Fig. 14 being taken on the line E—E of Fig. 12.
Figure 13:
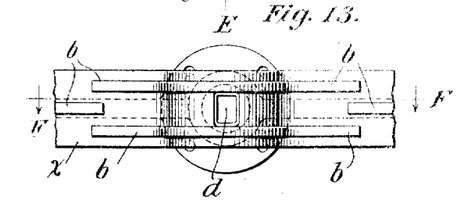
Figure 14:
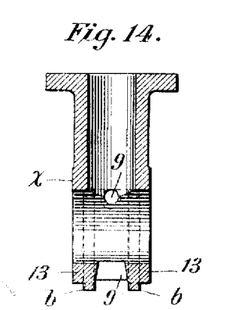

*The container feed ports.*—Certain of the containers are provided with feed inlets which are connected with the supply pipe through which the material to be treated enters. In the press shown in Figs. 1 and 2, I show six of these feed inlets, but I may use any number. For the purposes of facilitating the treatment in place and the removal of the unfilterable component each feed inlet used is provided with tapering feed ports as shown in Figs. 12, 13 and 14. The effect of this construction is that when the container is filled with the unfilterable component the wedge shaped block of solid or semi-solid material which forms in the feed port prevents any squeezing back into the channel, and also slips out easily when pressure is applied in the channel to effect another filling. When this form of feed port is used in connection with the feed inlets, it is sometimes preferable to make the feed channel $d$ exterior to the plates and frame as shown in Figs. 8 and 9; the filter cloth over the plate which in the other views makes the joint between the containers and the plates, being in this case below this channel, and a ring 48 of rubber or other suitable material is used fitting in a recess on the face of the extension of the container which forms the feed channel or in any other convenient manner thus making a tight joint as shown in Fig. 8.

Figure 15:
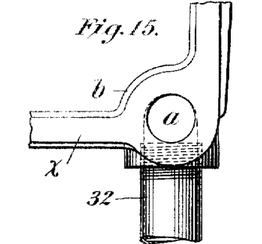
Fig. 15 is a detail view of a part of the solution discharge.

*The solution outlets.*—Certain of the containers are provided with outlets from the solution channel *a* whereby the filtrate or the liquid gas or vapor employed for treating the unfilterable component in place may be introduced or removed. Any number of such outlets may be used, but in the form of press shown in Figs. 1 and 2 four such solution outlets on either side are shown. Fig. 15 shows the manner in which the channel *a* of the containers provided with the solution outlets are connected with the pipe 32 through which the introduction or discharge is effected.

Figures 24, 25:
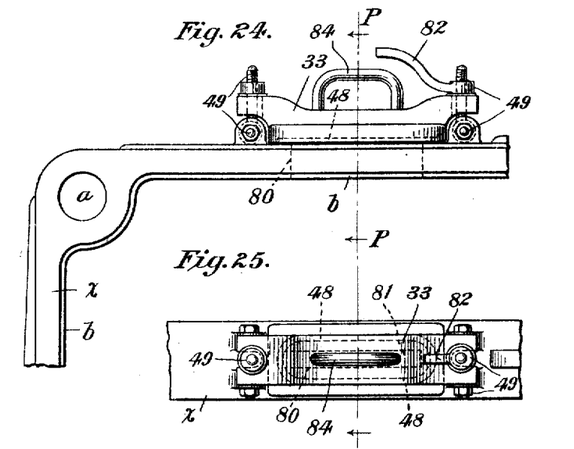
Figs. 24 to 26 inclusive, are detailed views in elevation plan and cross section of a mechanism for examining into the interior of the containers, Fig. 26 being taken on the line P—P of Figs. 24 and 25.
Figure 26:
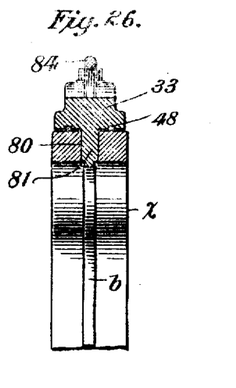

*The container inspecting device.*—Figs. 24, 25 and 26 show a device for permitting access to and inspection of the interior of the containers as well as for the introduction of material for purifying the liquid to be filtered, such as charcoal. In this construction, the upper surface of the container *x* is provided with an opening 80, preferably rectangular, and of suitable dimensions, clearly shown in plan view by the dotted lines in Figs. 24 and 25, and in cross section in Fig. 26. The block 33 is held in position in the opening in the container by the swiveling bolts and nuts 49 at either end, passing through slots at either end of the block 33, as shown in Fig. 25. By unscrewing the handle nuts at each end, the block may be lifted out of the opening by the handle 34, and access to the interior of the container may be had through the opening 80. When the block is in place and the nuts screwed down, a water tight joint is effected. This peep-gate or opening is particularly useful in determining when the washing out of the containers is complete, and in adjusting the angularity of the nozzles *y y* of the rotative pipe *w* to the vertical axis of the containers.

*The discharge outlets.*—Certain of the containers are provided with discharge outlets which connect with the discharge pipe 38. Any number of these outlets may be provided, but in the form of press shown in Figs. 1 and 2 six are shown. This connection is effected in the press shown by the six pipes, 26, 27, 28, 29, 30 and 31, as shown in Fig. 2, valves being provided as shown in Figs. 4 and 5.

Figure 27:
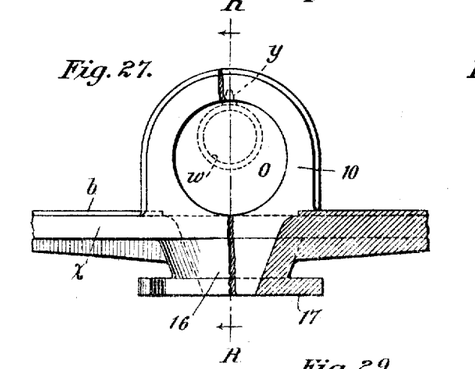
Figs. 27 to 29 inclusive, are enlarged detailed views in elevation cross section and plan respectively of the washout mechanism.
Figure 28:
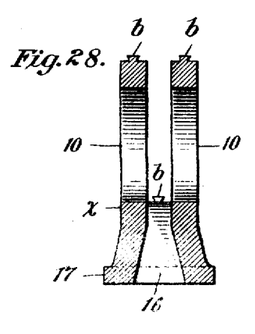
Figure 29:
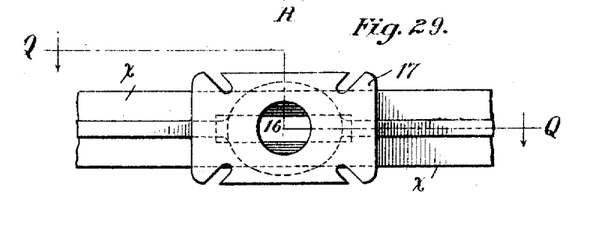

Figs. 27, 28, and 29, show on a large scale, the details of the form of outlet, used in connecting the containers connected with the discharge pipes 26, 27, 28, 29, 30 and 31. These are shown connected with the discharge pipes by any suitable form of valves.

The construction consists of cone-shaped projections with an opening 16 formed on the bottom of the container *x* below the ring 10 terminating in a flange 17 of the shape shown or in a threaded opening. By making the outlets in this form the level of the pulp which is the technical name for the mixture of unfilterable component and cleansing medium in the channel *o* is reduced thereby preventing the nozzles *y y* from being immersed in the pulp which interferes with the cutting effect upon the mass within the container of the stream of liquid, vapor or gas introduced therethrough and also reducing the amount thereof consumed, and the time expended in washing out.

Figure 3:
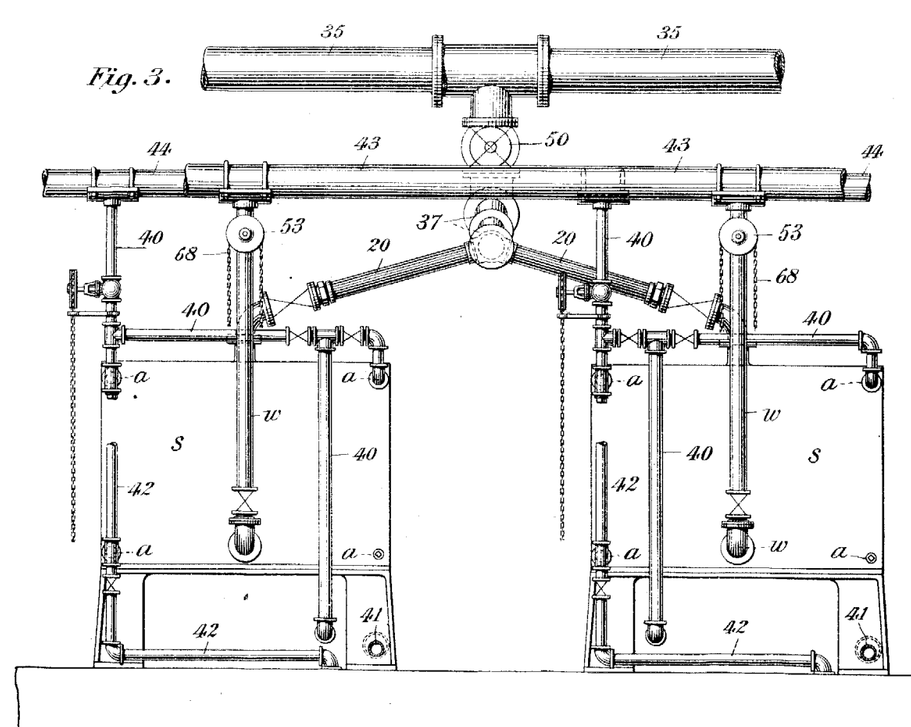
Fig. 3 is an end elevation of a plant looked at in the direction from left to right in Fig. 2.
Figure 4:
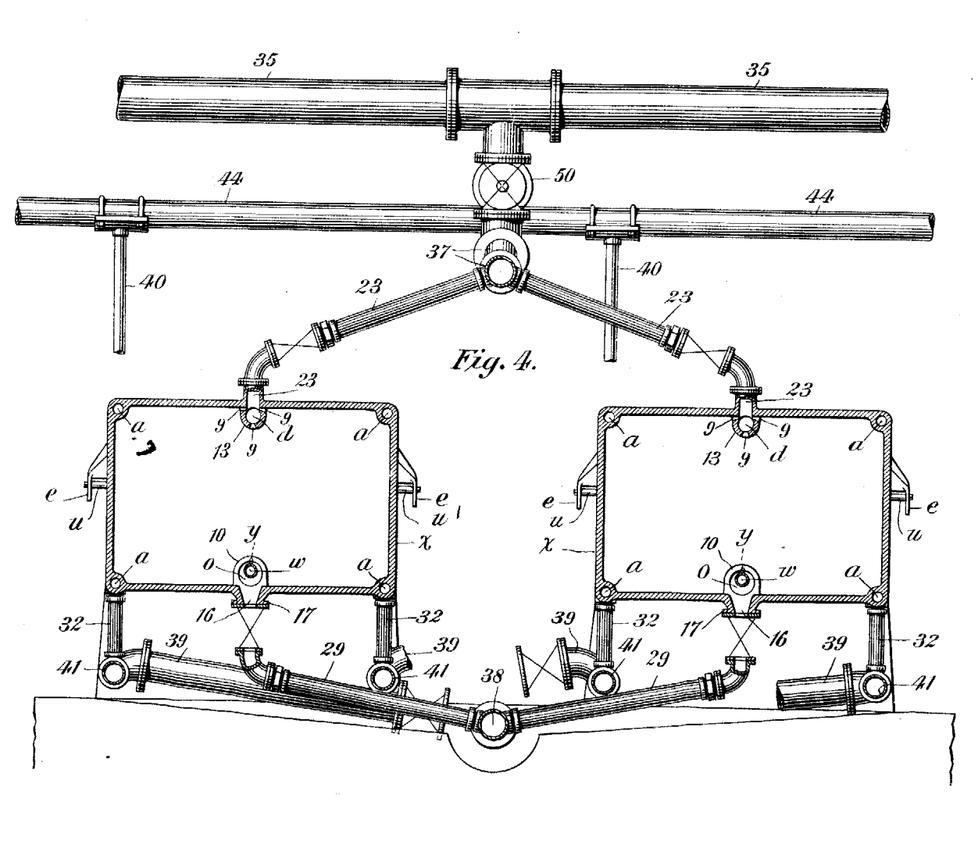
Fig. 4 is a vertical section of a plant on the line A—A of Fig. 2, looking in the direction of the arrows.

*The inlet and outlet pipes.*—The arrangement and disposition of these will be best understood by reference to Figs. 1, 2, 3, 4, 5, 6, and 7. In the various views where it appears, 35 is the main supply pipe through which the material to be filtered is introduced. This in the plant shown is placed over the presses crosswise to their length as shown in Figs. 2 and 3. It is controlled by a gate or valve 50 and connects with the pipe 37, from which a series of pipes 20, 21, 22, 23, 24 and 25 emerge on either side and pass downward to the two presses and enter the containers as shown in Figs. 4 and 5 at convenient points, thus making in each of the presses shown six inlets; 38 is the main discharge pipe which is connected by any convenient number of pipes 2´, 27, 28, 29, 30 and 31, with six discharge outlets in the containers by means of the tapering discharge ports 16.

Figure 7:
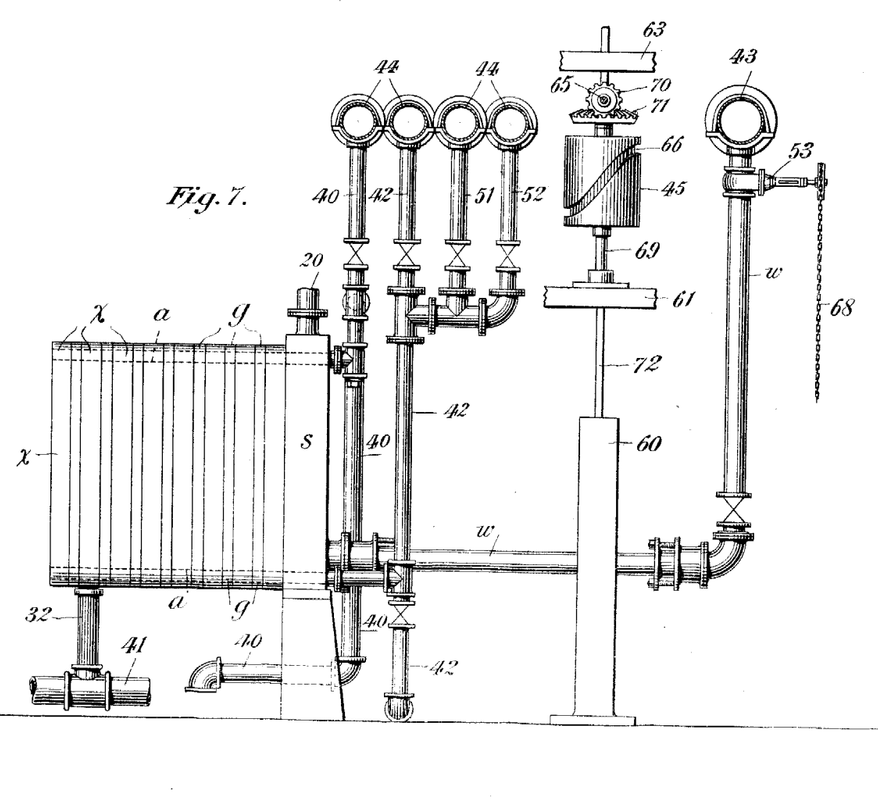
Fig. 7 is a vertical elevation of one end of the presses showing the solution pipes and their connections.

44 are the pipes through which the solution for the treatment of the contents of the container is introduced into the presses. Their arrangement and disposition is best shown in Figs. 2, 3 and 7. As will be seen, there are four of these pipes placed side by side, above the presses at the closed end. These have separate pipes emerging from them, 40 and 42. The right hand pair of pipes 44 in Fig. 7 is provided with the connecting pipes 51 and 52, with appropriate valves, whereby they may be connected with the pipe 42. The pipe 42 passes downward along the end of each press, and connects at the base with the pipe leading to the channel *a* at the lower left hand side of the press. The pipe 40 connects as shown in Fig. 3 with the openings *a* at the upper side of the press and thence passes downward and into the solution sump under the press. 32 are the solution outlets of which four are shown through which the filterable component is discharged from the presses. These connect into the channels *a* on the lower corners of the containers on either side and terminate as shown in Figs. 1, 2, 3, 4, and 7, in the pipes 41, running longitudinally along under the containers on either side. These discharge through the pipes 39 as shown in Figs. 1, 2 and 4, into the conduit under the plant or to any other convenient receptacle.

43 is the pipe through which the sluicing liquid enters, and this is connected with the pipe w and the entrance of the sluicing water is controlled by the movement of the valve 53.

The method of operation of the press is as follows: all openings and valves controlling openings being assumed to be closed. First all the clarified liquid and gaseous outlet valves are opened in the pipes 39 and 41, and then the valve 50 from the main feed pipe 35 to the lateral feed pipe 37 is opened as well as valves in the pipes 20, 21, 22, 23, 24 and 25. The mixture then passes into the top center continuous feed channel d, whence it finds its way through the tapering feed ports 9 into each container. The filter plates g are covered with filtering material which completes the closure of the containers x so far as the unfilterable component of the mixture is concerned, the filterable component passes through the filtering medium and out through the grooves or cores 8 in the plate; from these grooves or cores it passes in the case of a closed delivery press into the container channels a and in the case of an open delivery press directly to the exterior. In either case it may be collected and saved or wasted as desired. In the closed delivery form of press shown, any waste filterable component is discharged into the conduit m, and any filterable liquid which it is desired to save is discharged into the solution sump at the head of the press, whence it is conveyed by the pipes 18 thereunder wherever desired.

When the containers or frames are filled with the unfilterable component if it is desired to treat the material in place by a liquid, vapor or gas, such liquid, vapor or gas is introduced through the pipes 40 and 42 to one or both of the channels on one side of the press for convenience termed the on-going channel or channels, whence it finds its way behind the cloths of one series of alternate plates, through these, through the cakes and thence through the cloths covering the other series of alternate plates and out from behind these cloths into the other channel or channels on the other side of the press for convenience called the effluent or out-going channels. When it is desired to follow one on-going liquid, vapor or gas with another on-going liquid, vapor or gas, the on-going channels may be drained to prevent mixing by opening a valve controlling the outlet 42 before adding any on-going liquid, vapor or gas. When the compact mass of unfilterable material in the containers is ready to be removed all valves are closed. Then the valves controlling the discharge outlets 26, 27, 28, 29, 30 and 31 are opened, then the valve 53 which controls the feed of the cleansing medium to the sluicing pipe w is opened, the pipe w rotated by means of the movement of the heart-shaped cam 45 through the desired angle and the mixture of unfilterable component and cleansing medium drains out of the press through the bottom center channel 38 by means of the connections 26, 27, 28, 29, 30 and 31. This drainage may be facilitated by suction which may be obtained naturally by downward discharge or artificially by a pump or other device connected with the discharge system.

In the drawings, as will appear from Figs. 3 and 7 the pipes 40 and 42 are shown connected with the channels a in three of the four corners of the press, but if desired they may connect with openings for causing the liquid, vapor or gas to be admitted into the containers at one or any convenient number of points, either through the intervention of the passages a or directly into the containers in substantially the same general manner as the feed inlets. The pipe w may be rotated through any arc from zero to three hundred and sixty degrees, and may be reversed back through the same arc, or it may be arranged to be rotated continuously through the complete circle in one direction as may be found most suitable. Any number of these nozzles may be used in connection with any one container, and may be used singly or in pairs or in any desired numbers, or location.

I claim as my invention:

1. The combination in a pressure filter with suitable filter plates of a container provided with a direct inlet through which the material to be filtered may be introduced into the space within the same; a direct outlet from the container; a suitable gate for closing the outlet; and a pipe in front of the gate, provided with a device whereby when the gate is opened a cleansing medium may be introduced under pressure into the space within the container, and the unfilterable matter ejected therefrom.

2. The combination in a pressure filter with suitable filter plates of a series of containers each provided with a direct inlet through which the material to be filtered may be introduced into the space within the containers; a direct outlet from each container, a suitable gate for closing each outlet; and a pipe in front of the gates, provided with a series of devices whereby when the gates are opened a cleansing medium may be introduced under pressure into each of the spaces within the containers, and the unfilterable matter ejected from the interior.

3. The combination in a pressure filter with suitable filter plates of a container provided with an inlet through which the material to be filtered may be introduced into the space within the same, and a direct outlet; a suitable gate for closing the outlet; and a rotative pipe in front of the gate provided with a device whereby when the gate is opened a cleansing medium may be introduced under pressure into the spaces within the container, and the unfilterable matter ejected therefrom.

4. The combination in a pressure filter with suitable filter plates of a series of containers each provided with a direct inlet through which the material to be filtered may be introduced into the space within the containers; a direct outlet from each container; a suitable gate for closing each outlet; and a rotative pipe in front of the gates provided with a series of devices whereby when the gates are opened a cleansing medium may be introduced under pressure into each of the spaces within the containers, and the unfilterable matter ejected from the interior.

5. The combination in a pressure filter with suitable filter plates, of a container provided with a direct inlet through which the material to be filtered may be introduced into the space within the same; a direct outlet from the container; a suitable gate for closing the outlet; and a rotative pipe in front of the gates provided with a device whereby when the gate is opened a cleansing medium may be introduced under pressure into the space within the container, and the unfilterable matter ejected therefrom.

6. The combination in a pressure filter, with suitable filter plates of a container provided with an inlet through which the material to be filtered may be introduced into the space within the same, a direct outlet, a suitable gate for closing the outlet, and a device whereby when the gate is opened a cleansing medium may be introduced under pressure into the space within the container, and the unfilterable material ejected therefrom.

7. The combination in a pressure filter with suitable filter plates of a series of containers each provided with an inlet through which the material to be filtered may be introduced into the space within the same and a direct outlet; suitable means for closing the outlet; and a device whereby when each outlet is opened, a cleansing medium may be introduced under pressure into the space within each container, and the unfilterable matter ejected therefrom.

8. The combination in a pressure filter, with suitable filter plates of a series of containers each provided with an inlet through which the material to be filtered may be introduced into the space within the same and a direct outlet; a suitable gate for closing each outlet, and a device whereby when each gate is opened a cleansing medium may be introduced under pressure into the space within each container, and the unfilterable material ejected therefrom.

9. The combination in a pressure filter with suitable filter plates of a series of containers each provided with an inlet through which the material to be filtered may be introduced into the space within the same and a direct outlet in the bottom, suitable means for closing the outlets of each container, and a device whereby when each outlet is opened, a cleansing medium may be introduced under pressure into the spaces within the container, and the unfilterable matter ejected therefrom.

10. The combination with a filter press of a suitable container and a rotative washout pipe provided with suitable means whereby the same may be rotated at a variable speed approximately inversely proportioned to the distance from the opening in said washout pipe to a point in line therewith on the interior surface of the container.

11. In a filter press, the combination of the rotative washout pipe, a pinion attached thereto; a rod attached at one end to a rack engaging with said pinion; suitable guides in which the rod slides and a cam device rotated from a suitable source of power engaging with the rod at the other end, whereby a reciprocating motion of varying speed is imparted through the rack to the washout pipe.

12. In a filter press, the combination of the rotary washout pipe, a pinion attached thereto; a rod attached at one end to a rack engaging with said pinion; suitable guides in which the rod slides and a cylinder provided with a suitable groove rotated from a suitable source of power engaging with the rod at the other end, whereby a reciprocating motion of varying speed is imparted through the rack to the washout pipe.

13. In a filter press composed of a series of containers and plates put together, the combination with the horizontal discharge passage of a discharge outlet from a container placed between the ends of the filter press for facilitating the discharge from the discharge passage.

14. In a filter press composed of a series of containers and plates put together, the combination with the horizontal discharge passage of a discharge outlet from a container placed between the ends of the filter press below the discharge passage and made in the form of an inverted cone for facilitating the discharge from the discharge passage.

15. In a filter press composed of a series of containers and plates put together, the combination with the horizontal discharge passage, of a discharge outlet from a container placed between the ends of the filter press below the outlet channel made in the form of an inverted cone, and leading to the exterior of the press and provided with flanges whereby the same may be coupled to the discharge pipe.

16. In a filter press composed of a series of containers or plates put together, the combination with the horizontal discharge passage of a plurality of discharge outlets from suitable containers of the press placed between the ends of the filter press at convenient distances apart for facilitating discharge from the discharge passage.

17. In a filter press, the combination with the containers and the filter plates of devices through which the material to be filtered is admitted thereto, devices whereby the solid material in place in the containers may be subjected to consecutive treatments by different chemical reagents substantially as described, devices by means of which the interior of the containers can be washed out, without taking the press apart, and devices by means of which the contents thus washed out may be removed.

18. In a filter press, the combination with the containers and the filter plates of a series of pipes controlled by suitable valves through which the material to be filtered is admitted thereto, a series of pipes controlled by suitable valves whereby the solid material in place in the containers may be subjected to consecutive treatments by different chemical reagents substantially as described, a series of devices by means of which the interior of the containers can be washed out, without taking the press apart, and an opening controlled by suitable valves by means of which the contents thus washed out may be removed.

19. In a filter press, the combination with the containers and the filter plates of a series of pipes controlled by suitable valves through which the material to be filtered is admitted thereto, a series of pipes controlled by suitable valves whereby the solid material in place in the containers may be subjected to consecutive treatments by different chemical reagents substantially as described, a rotary pipe provided with suitable opening entering each container capable of introducing cleansing material at any desired angle of direction by means of which the interior of the containers can be washed out without taking the press apart, and an opening controlled by suitable valves by means of which the contents thus washed out may be removed.

In testimony, that I claim the foregoing as my invention, I have signed my name in presence of two witnesses, this 1st day of March 1906.

CHARLES W. MERRILL.

Witnesses:
HORACE S. CLARK,
GEO. D. FOGLESONG.